United States Patent [19]
DiGiulio

[11] Patent Number: 6,111,180
[45] Date of Patent: Aug. 29, 2000

[54] PLAYING CARDS FOR TEACHING READING OF MUSICAL NOTES

[76] Inventor: Joann L. DiGiulio, 8102 5th Ave., North Bergen, N.J. 07047

[21] Appl. No.: 09/339,730
[22] Filed: Jun. 24, 1999
[51] Int. Cl.⁷ ..................................................... G09B 15/02
[52] U.S. Cl. .......................................................... 84/471 R
[58] Field of Search ............................. 84/470 R, 471 R, 84/476, 477 R, 481, 483.2; 273/301; D21/353, 376

[56] References Cited

U.S. PATENT DOCUMENTS

| | | | |
|---|---|---|---|
| 104,833 | 6/1870 | Costello | 84/476 |
| 292,312 | 1/1884 | Hofer | 84/470 R |
| 593,731 | 11/1897 | Adler | 84/470 R |
| 621,323 | 3/1899 | Chamberlin | 84/481 |
| 702,298 | 6/1902 | Frederickson | 84/481 |
| 972,335 | 10/1910 | Church . | |
| 1,114,139 | 10/1914 | Hoffmann | 84/470 R |
| 1,133,773 | 3/1915 | Widdis | 84/470 R |
| 1,139,098 | 5/1915 | Bostwick . | |
| 1,217,810 | 2/1917 | Noel | 84/481 |
| 1,275,869 | 8/1918 | Deal | 84/481 |
| 1,283,695 | 11/1918 | Diriwachter | 84/470 R |
| 1,392,977 | 10/1921 | Swan | 84/481 |
| 1,589,878 | 6/1926 | Gilbert . | |
| 1,675,528 | 7/1928 | Bishop | 84/481 |
| 2,231,020 | 2/1941 | McCaulley | 273/301 |
| 2,582,544 | 1/1952 | Johnson | 273/301 |
| 4,061,337 | 12/1977 | Callender | 273/134 |

FOREIGN PATENT DOCUMENTS

| | | |
|---|---|---|
| 1368701 | 4/1958 | France . |
| 1203151 | 1/1960 | France . |
| 421 | 3/1995 | United Kingdom . |

OTHER PUBLICATIONS

Encyclopedia Britannica, vol. 24, pp. 516–518, 1994.

Primary Examiner—Robert E. Nappi
Assistant Examiner—Kim Lockett
Attorney, Agent, or Firm—Robin, Blecker & Daley

[57] ABSTRACT

A set of playing cards divided into card groups, each card group corresponding to a different note value and containing cards depicting all of the tones of an octave of the chromatic scale. Each card of the card set is associated with only a single tone and depicts the one or more notes corresponding to that tone.

9 Claims, 6 Drawing Sheets

| Chromatic Notes | Equivalents |
|---|---|
| C | |
| C sharp (#) | D flat (b) |
| D | |
| D sharp (#) | E flat (b) |
| E | |
| F | |
| F sharp (#) | G flat (b) |
| G | |
| G sharp (#) | A flat (b) |
| A | |
| A sharp (#) | B flat (b) |
| B | |
| C1 | |

| Game Description | Notes   Note Values   Symbols |
|---|---|
|  |  |

FIG. 6

PLAYING CARDS FOR TEACHING READING OF MUSICAL NOTES

BACKGROUND OF THE INVENTION

This invention relates to the teaching of the reading of music and, in particular, to such teaching using well-known card games.

Music tones are conventionally represented by indicia called notes. Each tone has one or more notes which correspond to the tone. Moreover, the length of time that a tone is played is referred to as a note value. These note values are, typically, categorized as whole notes, half notes, quarter notes, eighth notes, etc.

Various tools have been used to teach children and adults how to recognize different tones via their corresponding notes depicted on a staff for different note values, and provide a source of educational entertainment. These tools are used to stimulate the student, since teaching the skill of reading notes can be extremely tedious and boring, particularly for children.

Game formats have been developed for this purpose. Some of these game formats have been based on conventional playing cards.

U.S. Pat. No. 702,298 discloses one type of playing card game format with the intention of teaching the reading of music and learning of diatonic scales and chords. This game format utilizes fifty-two playing cards, music-notes and four different suits corresponding, respectively, to eighth notes, quarter notes, half notes, and whole notes. These playing cards, moreover, in one deck use notes of parts of the chromatic scale from E to C or c to a1.

Each card of the '298 patent is somewhat complicated, since it includes three notes corresponding to three different tones. An enlarged central depiction of a note represents the card tone, while smaller depictions preceding and succeeding the central note represent the tones preceding and succeeding the card tone in the chromatic scale. For example, a card of the deck representing the tone symbolized by the note D includes an enlarged depiction of the note D, which is preceded and followed, respectively, by smaller depictions of notes representing the preceding and following tones, i.e., the note D flat and the note D sharp. As a result of having notes corresponding to more than one tone on each card, notes are duplicated from card to card.

The card deck of the '298 patent also uses different colors for each of the four suits or different note values. Moreover, the patent discloses certain card games which can be played with the cards, as well as states that the cards can be used to play almost all the games played with ordinary playing cards.

Due to the cards of the '298 patent using three notes corresponding to three different tones on a card, the cards are difficult to understand and this detracts from their usefulness, especially when trying to teach children.

It is, therefore, an object of the present invention to provide a card set for teaching the reading of music which is simple to use.

It is a further object of the present invention to provide a card set for teaching the reading of music which is comprehensive in teaching musical notes.

SUMMARY OF THE INVENTION

In accordance with the principles of the present invention, the above and other objectives are realized in a card set for teaching the reading of music in which the card set is divided into a plurality of card groups each corresponding to a different note value. The cards in each card group depict the notes corresponding to all the tones for an octave of the chromatic scale, e.g., C, C sharp, D, D sharp, E, F, F sharp, G, G sharp, A, A sharp, B and C1. Moreover, each card is associated with only one tone. Where one tone corresponds to and can be depicted by more than one note of the chromatic scale, e.g., D sharp and E flat are notes corresponding to and depicting the same tone, the card for this tone includes the corresponding notes.

By including cards for four note values, i.e., by including four card groups, and by further including cards for all of the thirteen tones of the chromatic scale in each card group, the card set has 52 cards corresponding to a standard card deck. As a result, the card set can be used to play the standard card games playable with a standard card deck. Additionally, since each card only includes the notes for a single tone, the cards can be easily read and understood by players particularly children.

Also, the card set can be combined with an instruction manual which depicts the particular notes of the chromatic scale so as to facilitate learning of the notes. The manual can also provide instructions for various card games playable with the card set.

BRIEF DESCRIPTION OF THE DRAWINGS

The above and other features and aspects of the present invention will become more apparent upon reading the following detailed description in conjunction with the accompanying drawings, in which:

FIG. 1 sets forth the notes corresponding to the tones of the chromatic scale including the various notes corresponding to the same tone;

FIG. 6 depicts an instruction manual describing card games that can be played with the card set of the invention and including a chart naming and depicting the notes corresponding to the tones of an octave of the chromatic scale.

DETAILED DESCRIPTION

FIG. 1 is provided for illustrative purposes and shows the notes corresponding to the thirteen tones of an octave of the chromatic scale. Where there is more than one note representing the same tone on the chromatic scale, both notes are illustrated in FIG. 1. The chromatic scale for different octaves is identified similarly except with a 1, 2, etc. to indicate the increasing octaves.

In accordance with the principles of the present invention, a card set is provided in which the cards are divided into card groups or suits, each of which corresponds to a particular note value. Each card group includes thirteen cards depicting the notes corresponding to the thirteen tones of an octave of the chromatic scale. Where a tone has more than one corresponding note, the various corresponding notes are depicted.

By limiting each card to the notes depicting one tone, sight recognition of the tone and its corresponding notes is made easier. Likewise, the repetition of the tones for the different note values, reinforces learning. Using the card set, the thirteen tones, and their corresponding notes in the chromatic scale represented by the cards of a card group or suit can be quickly learned.

Moreover, the use of four different note values each with thirteen different tones of the chromatic scale results in a 52 card deck. As a result, all the standard care games can be played with the deck. This makes learning the tones and corresponding notes a pleasurable experience especially for younger students and children.

Figure 2:
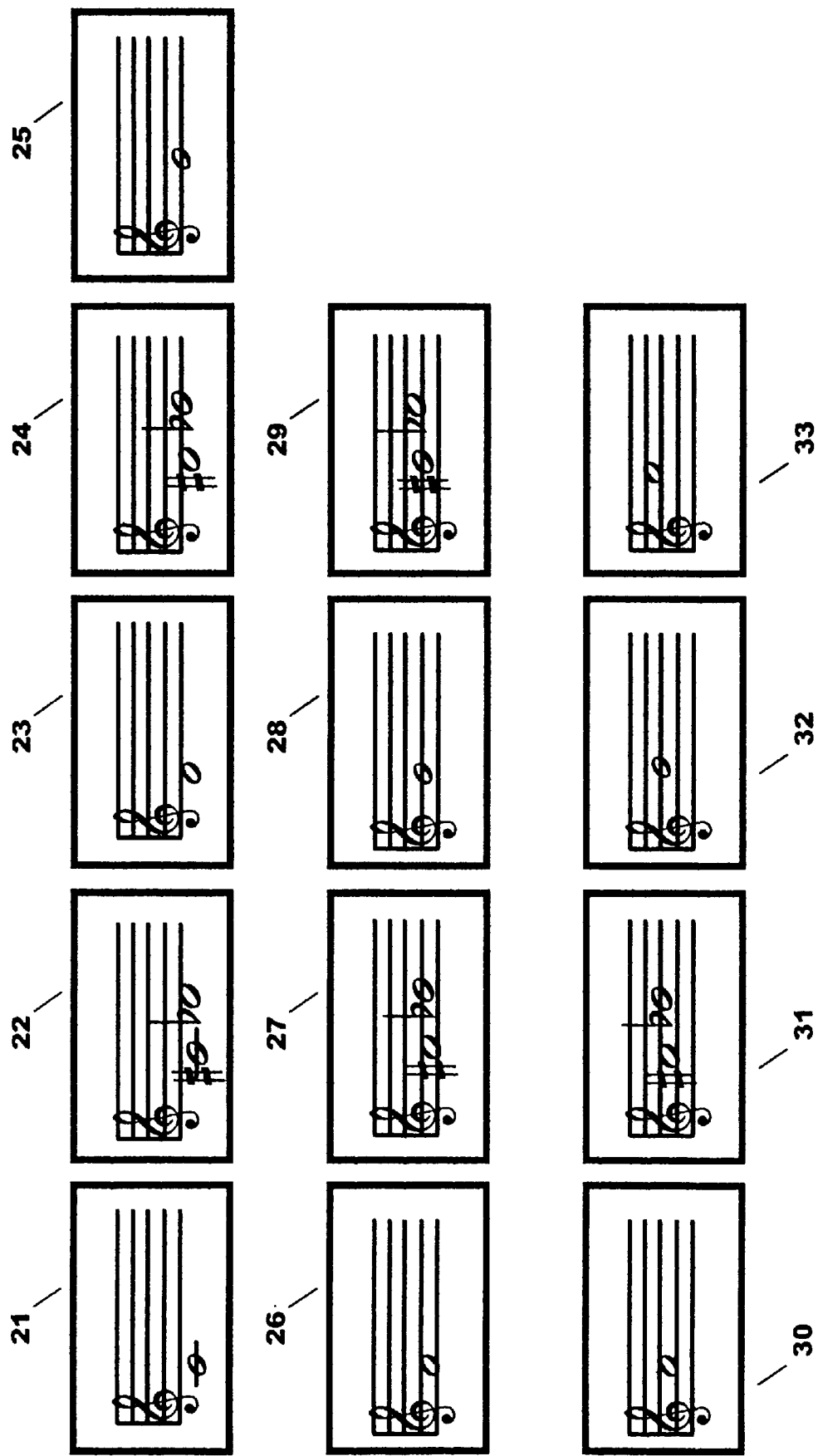
FIG. 2 shows the cards for a first card group corresponding to a first note value or suit of a card set in accordance with the principles of the invention.
Figure 3:
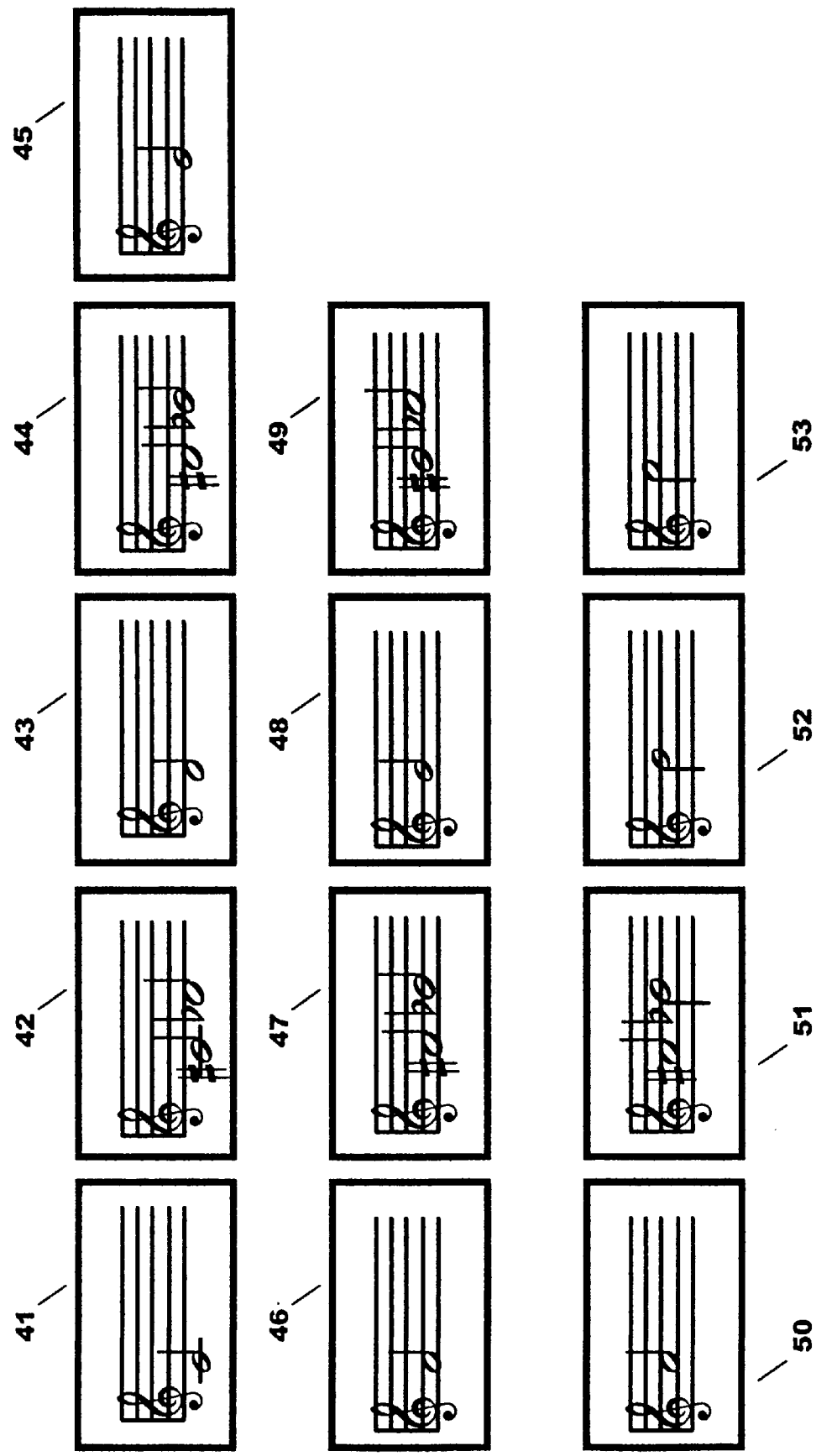
FIG. 3 shows the cards for a second card group corresponding to a second note value or suit of a card set in accordance with the principles of the present invention.
Figure 4:
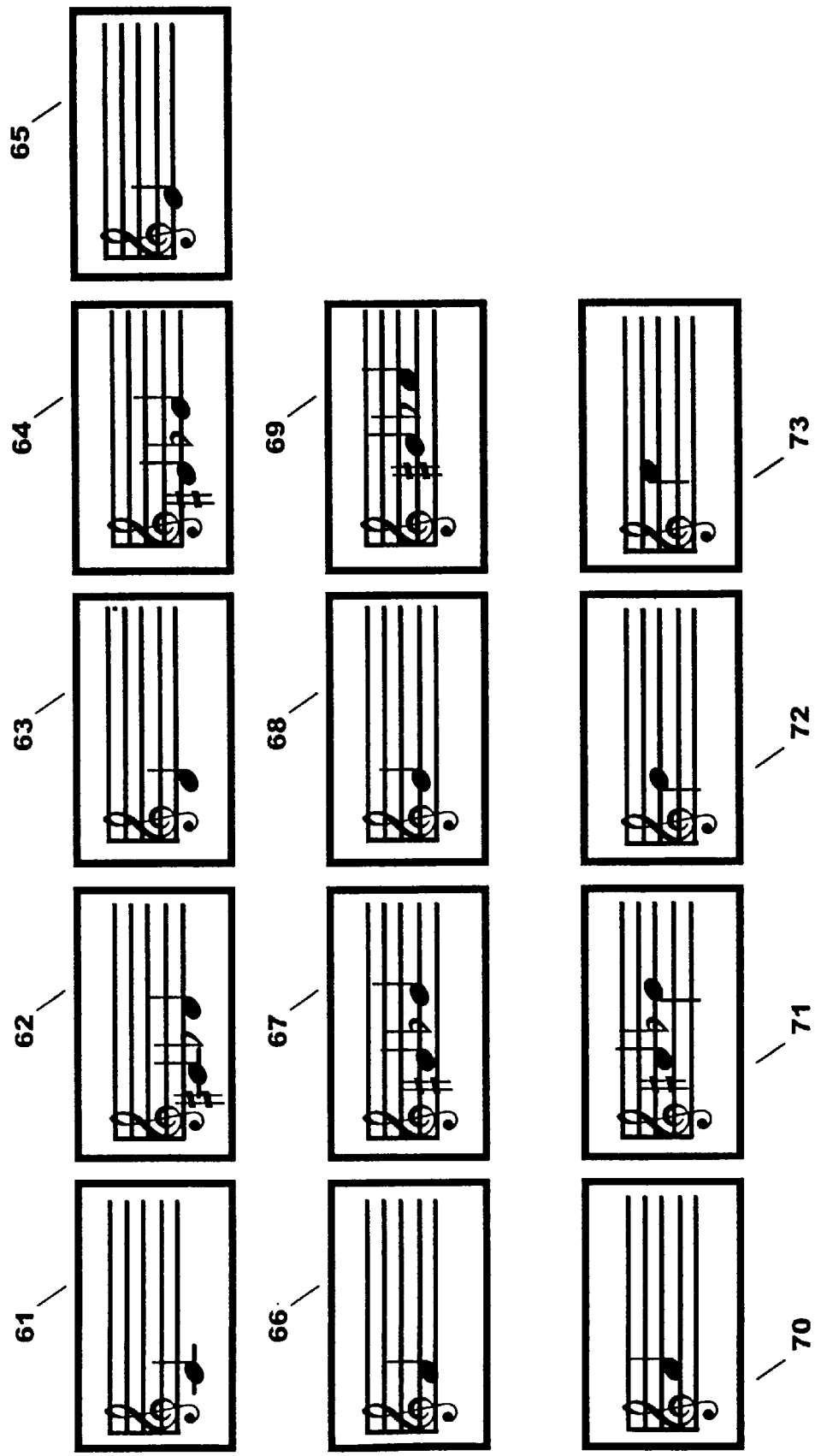
FIG. 4 shows the cards for a third card group corresponding to a third note value or suit of a card set in accordance with the principles of the present invention.

FIGS. 2–4 show the cards of a representative card set in accordance with the principles of the invention. The cards of FIGS. 2–4 correspond to card groups or suits corresponding to whole notes, half notes, quarter notes and eighth notes. These form the four suits of the deck. The thirteen cards in each suit, in turn, correspond to the thirteen tones of a particular octave of the chromatic scale.

Figure 5:
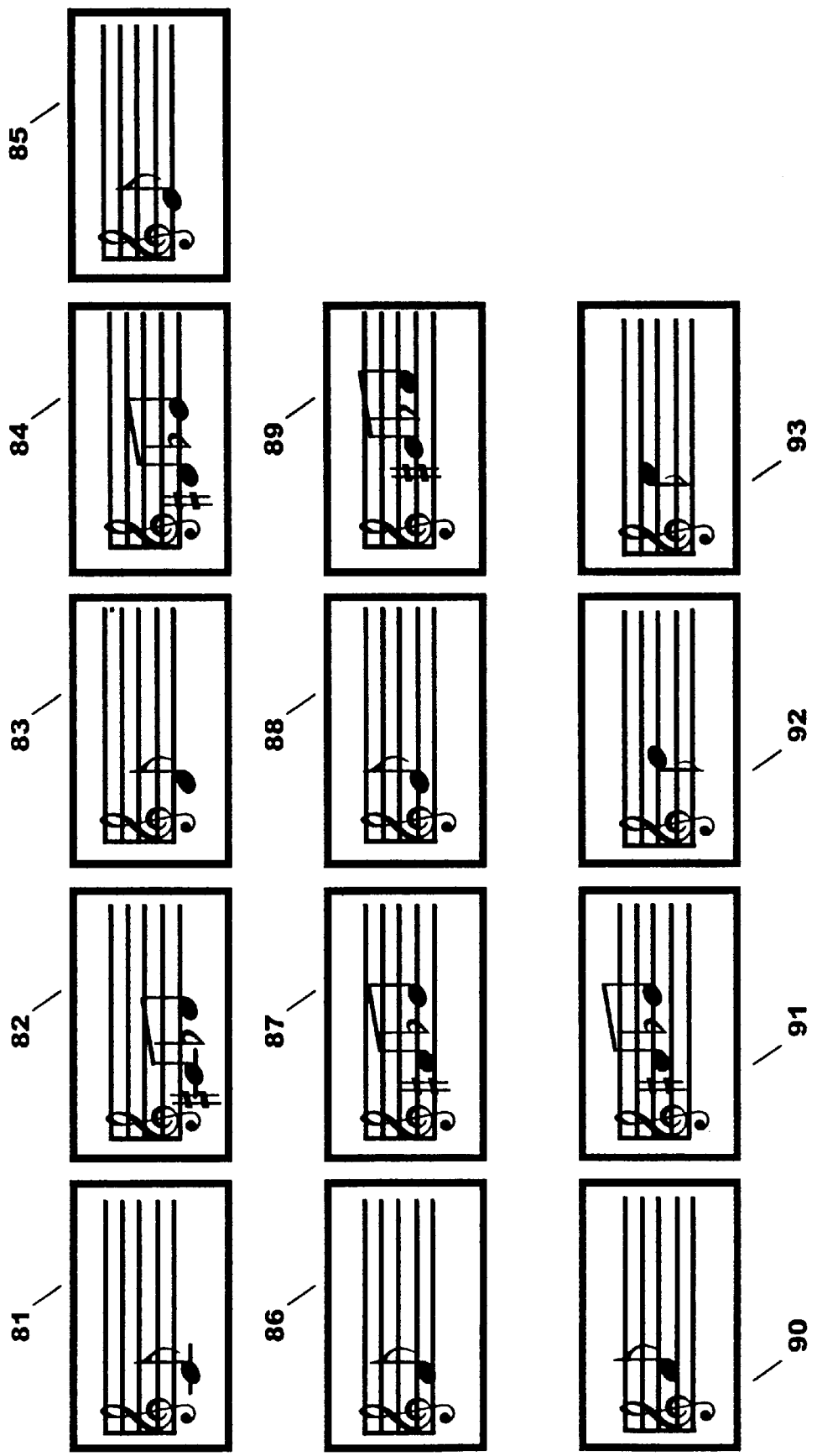
FIG. 5 shows the cards for a fourth card group corresponding to a fourth note value or suit of a card set in accordance with the principles of the present invention.

More particularly, cards 21–33 in FIG. 2 depict the notes C, C sharp, D, D sharp, E, F, F sharp, G, G sharp, A, A sharp, B and C1 for whole note values. Moreover, the cards 22, 24, 27, 29 and 31 also depict the equivalent notes, (i.e., the notes corresponding to the same tone) i.e., D flat, E flat, G flat, A flat and B flat, respectively. Similarly, the cards 41–53 of FIG. 3, the cards 61–73 of FIG. 4 and the cards 81–93 of FIG. 5 depict the notes for the chromatic tones for the half, quarter and eighth note values.

As can be appreciated, the four note values used in the card set, need not be the whole through eighth note values. Thus, for example, the half through sixteenth note values can be used. As long as four different note values corresponding to four different notes are employed, a 52 card deck can be provided.

Moreover, the notes for each suit need not be the thirteen notes of the octave of the chromatic scale depicted, i.e., C to C1. Thus, the thirteen notes for any octave can be used to form the cards for a given suit.

As stated above, since the card set of the invention comprises four suits or note values with thirteen cards in each suit, a 52 card deck similar to a standard card deck is formed. As a result, as also stated above, the card deck can be used to play many of the standard card games playable with a standard card set. Thus, for example, the following card games may be played: Crazy Eights, Kings in the Corner, Spit, Steal the Old Man's Pack, Solitaire and Go Fish. Of these Go Fish and Crazy Eights are beneficial for teaching younger children.

The card set of the invention can be used with a manual 101 shown in FIG. 6. The manual can explain the various games playable with the card set and also include a table showing the tones of the chromatic scale as depicted by the corresponding notes to aid the user using the card set to sight read the card notes.

The cards of FIGS. 2–4 are illustrated with a standard treble or G clef on a musical staff of five lines. However, other standard forms of clefs and staffs can also be used in depicting the notes.

In all cases it is understood that the above-described arrangements are merely illustrative of the many possible specific embodiments which represent applications of the present invention. Numerous and varied other arrangements can be readily devised in accordance with the principles of the present invention without departing from the spirit and scope of the invention.

What is claimed is:

1. A deck of playing cards for teaching the reading of music comprising:

a set of cards divided into a plurality of different card groups, each card group corresponding to a different musical note value and containing cards depicting the musical tones in the chromatic scale, each card being associated with only a single tone of the chromatic scale and depicting one or more notes corresponding to that tone and the note value associated with the card.

2. A deck of playing cards in accordance with claim 1 wherein:

said card groups include four card groups;

each of the cards in each card group depict a different one of the following musical tones: C, C sharp, D, D sharp, E, F, F sharp, G, G sharp, A, A sharp, B and C1.

3. The deck of playing cards in accordance with claim 2 wherein:

said four card groups correspond, respectively, to the whole note value, half note value, quarter note value and eighth note value.

4. The deck of playing cards in accordance with claim 2, wherein:

each card depicts all the notes in a given octave of the chromatic scale corresponding to the tone associated with the card.

5. A deck of playing cards for teaching the reading of music comprising:

a set of cards divided into a plurality of different card groups, each card group corresponding to a different musical note value and containing cards depicting the musical tones in the chromatic scale, each card being associated with only a single tone of the chromatic scale and depicting one or more notes corresponding to that tone and the note value associated with the card;

said card groups including four card groups;

each of the cards in each card group depicting a different one of the following musical tones: C, C sharp, D, D sharp, E, F, F sharp, G, G sharp, A, A sharp, B and C1; and each card depicting C sharp, D Sharp, F sharp, G sharp and A sharp also depicting, respectively, D flat, E flat, G flat, A flat and B flat.

6. The deck of playing cards in accordance with claim 1 wherein:

each card depicts all of the notes in a given octave of the chromatic scale corresponding to the tone associated with the card.

7. The deck of playing cards in accordance with claim 1 wherein:

said card groups include four card groups, each card group including cards associated with the musical tones of the same preselected octave of the chromatic scale.

8. The deck of playing cards in accordance with claim 7, wherein:

each card group includes thirteen cards each of which being associated with a different musical tone of said preselected octave of the chromatic scale.

9. The deck of playing cards in accordance with claim 8 wherein:

each card depicts all of the notes in a given octave of the chromatic scale corresponding to the tone associated with the card.

* * * * *